United States Patent [19]

Hurst

[11] Patent Number: 5,140,420
[45] Date of Patent: Aug. 18, 1992

[54] INFORMATION IN VERTICAL BLANKING INTERVAL OF VIDEO SYNC SIGNAL

[75] Inventor: Robert N. Hurst, Cherry Hill, N.J.

[73] Assignee: General Electric Company, Philadelphia, Pa.

[21] Appl. No.: 593,456

[22] Filed: Oct. 5, 1990

[51] Int. Cl.⁵ ............................................. H04N 7/087
[52] U.S. Cl. .................................................... 358/147
[58] Field of Search ................................ 358/147, 145

[56] References Cited

U.S. PATENT DOCUMENTS

| | | | |
|---|---|---|---|
| 2,295,023 | 9/1942 | Beatty et al. | 358/147 |
| 2,563,684 | 8/1951 | Lord | 358/145 |
| 2,624,797 | 1/1953 | Lawson et al. | 358/145 |
| 3,017,457 | 1/1962 | Johnson | 358/147 |
| 3,798,610 | 3/1974 | Bliss et al. | 340/172.5 |
| 4,354,201 | 10/1982 | Sechet et al. | 358/122 |
| 4,394,690 | 7/1983 | Kobayashi | 358/180 |
| 4,567,531 | 1/1986 | Tabata | 358/335 |
| 4,625,235 | 11/1986 | Watson | 358/86 |
| 4,638,359 | 1/1987 | Watson | 358/147 |
| 4,641,188 | 2/1987 | Dischert | 358/147 |
| 4,725,886 | 2/1988 | Galumbeck et al. | 358/147 |
| 4,750,036 | 6/1988 | Martinez | 358/147 |
| 4,912,550 | 3/1990 | Lilley | 358/17 |

FOREIGN PATENT DOCUMENTS

| | | | |
|---|---|---|---|
| 2327645 | 12/1974 | Fed. Rep. of Germany | 358/147 |
| 2856663 | 7/1980 | Fed. Rep. of Germany. | |
| 95682 | 4/1989 | Japan | 358/147 |

Primary Examiner—John W. Shepperd
Attorney, Agent, or Firm—Raymond E. Smiley; Allen E. Amgott

[57] ABSTRACT

In a television sync signal one or more of the post-equalizing pulses of the vertical blanking interval is/are altered in duration to provide information to a receiving circuit.

6 Claims, 4 Drawing Sheets

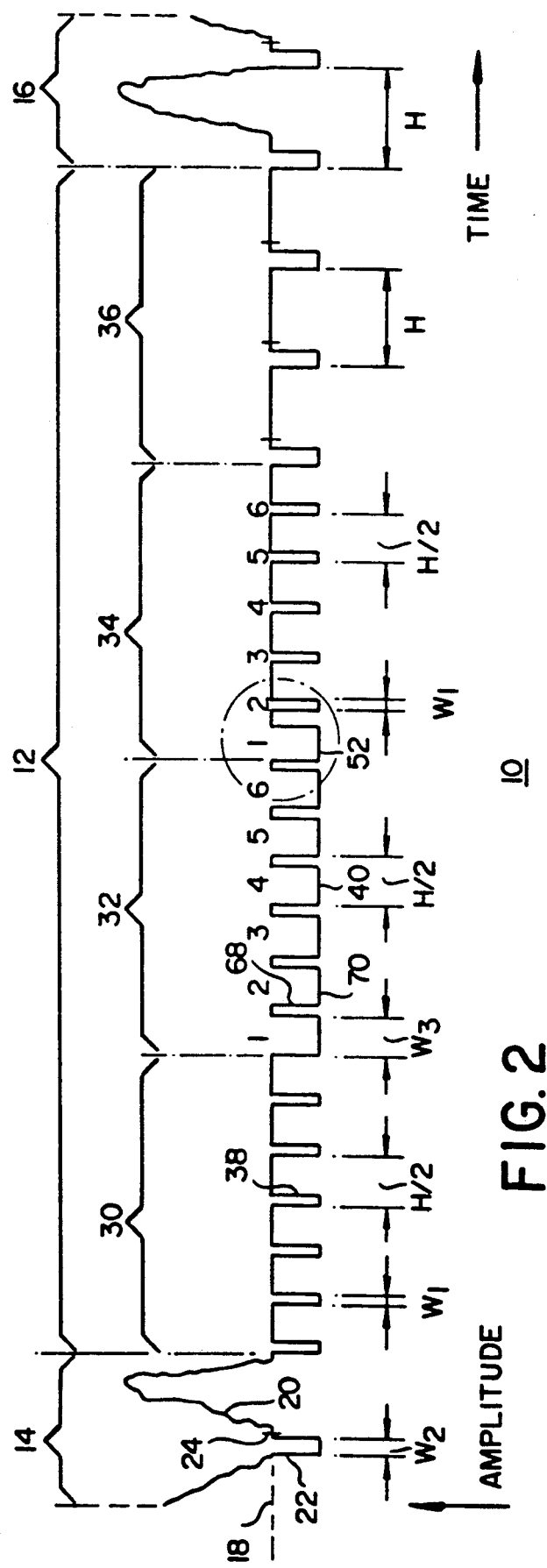
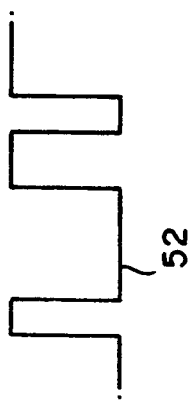
FIG. 2
FIG. 3

INFORMATION IN VERTICAL BLANKING INTERVAL OF VIDEO SYNC SIGNAL

The invention described herein was made in the performance of work under NASA Contract No. NAS9-18200 and is subject to the provisions of Section 305 of the National Aeronautics and Space Act of 1958 (42 U.S.C. 2457).

BACKGROUND OF THE INVENTION

1. Field of Invention

This invention is concerned with altering the vertical blanking interval of a video sync signal in accordance with supplied information, and, more particularly, with altering the post-equalizing portion thereof.

2. Description of the Prior Art

A standard television composite signal includes video intervals alternating with blanking intervals. In amplitude, the video intervals vary in amplitude within the video level on one side of (i.e., above or below — positive going or negative going) a fixed amplitude level often known as the blanking level or the black level, while synchronization pulses during the blanking interval extend to an amplitude known as the sync level on the other side of (below or above — negative going or positive going) the blanking level. The sync level is also known as the blacker-than-black level. For purposes of discussion, the video signal will be assumed to be above the blanking level and the sync will be assumed to be below the blanking level.

There are two types of blanking intervals, the horizontal blanking interval which occurs once for each line of the video image and which contains a single horizontal sync pulse, and the vertical blanking interval which occurs after each field (312½ or 262½ lines) of video information. The vertical blanking interval includes six relatively wide vertical synchronization pulses preceded by six relatively narrow pre-equalization pulses and followed by six relatively narrow post-equalization pulses all extending between the blanking level and sync level. The vertical blanking interval also contains other sync pulses which are like the horizontal sync pulses in duration and spacing.

Television engineering professionals have, for years, tried to expand the information content of the composite signal to add features not contemplated by the originators of the signal specification. Many of the ideas for expanding the information contents of the signal in the vertical blanking interval involve placing information in the video amplitude levels. Some practitioners place information in the video amplitude portion of the vertical blanking interval where the horizontal rate sync pulses are located with the idea that the information is located in a portion of the signal which is at the top of the TV signal and thus not observable by a viewer.

U.S. Pat. Nos. 4,625,235 and 4,638,359, issued Nov. 25, 1986 and Jan. 20, 1987, respectively, to John N. Watson describe and illustrate the alteration of the post-equalization pulse portion of the vertical blanking interval to add information content as illustrated in FIG. 6A. In FIG. 6A the vertical axis represents amplitude and the horizontal axis represents time. As illustrated in FIG. 6A, the video level is up, positive going, and the sync pulse level is down, negative going, relative to the unlegended blanking level.

In the prior art, all modification to the signal, except for color burst, have involved changing the video amplitudes and have not involved modifying the sync signals. The color burst is located in the horizontal blanking interval following the horizontal sync pulse in the portion of the horizontal blanking interval known as the "back porch". It varies in amplitude like the video signal, but unlike the video signal, is centered about the blanking level.

The actual duration of the various sync pulses has not been altered in the prior art. In the early days of television, the timing and duration of each horizontal sync pulse was considered unalterable and there were no synchronization pulses in the vertical blanking interval. It was soon realized that with no synchronizing pulses in the vertical blanking interval that the TV receiver would not stay synchronized with the transmitting equipment. The solution was to add synchronization pulses in the vertical blanking interval, particularly, the pre-equalization and vertical sync pulse interval pulses. The pre-equalizing pulses were found to be necessary due to the interlaced nature of the standard television signal. Without the pre-equalizing pulses the position of the horizontal pulses relative to the vertical pulses would shift by half line every field. The placement of the pre-equalization pulses solved that problem.

The six post-equalizing pulses were added, however, for a different reason. It was found that vacuum-tube blocking oscillators used in early TV sets were upset in some manner if the sync returned directly to the horizontal pulses after the vertical sync pulses were received. The six post-equalizing pulses were therefore added to protect what was then a universally used pulse identification circuit. The six post-equalizing pulses do not currently serve a useful purpose, but they may not be deleted because they are part of more than a half-century old standard.

SUMMARY OF THE INVENTION

In accordance with the preferred embodiment of the present invention, an apparatus which includes means for producing a television vertical blanking interval signal which signal includes a pre-equalization interval, a vertical synchronization pulse interval, and a post-equalization pulse interval, and wherein the post-equalization pulse interval comprises a plurality of relatively short duration pulses spaced at a relatively long pitch, the improvement comprises means responsive to a source of information for extending the duration, without changing the amplitude, of at least one of the short duration pulses in accordance with the value of the information received.

BRIEF DESCRIPTION OF THE DRAWING

FIG. 2 illustrates the same portion of composite video signal centered about the vertical blanking interval as in FIG. 1 in accordance with the present invention;

FIG. 3 illustrates a portion of the vertical blanking interval drawn to a larger scale;

DETAILED DESCRIPTION OF THE PRESENT INVENTION

Figure 1:
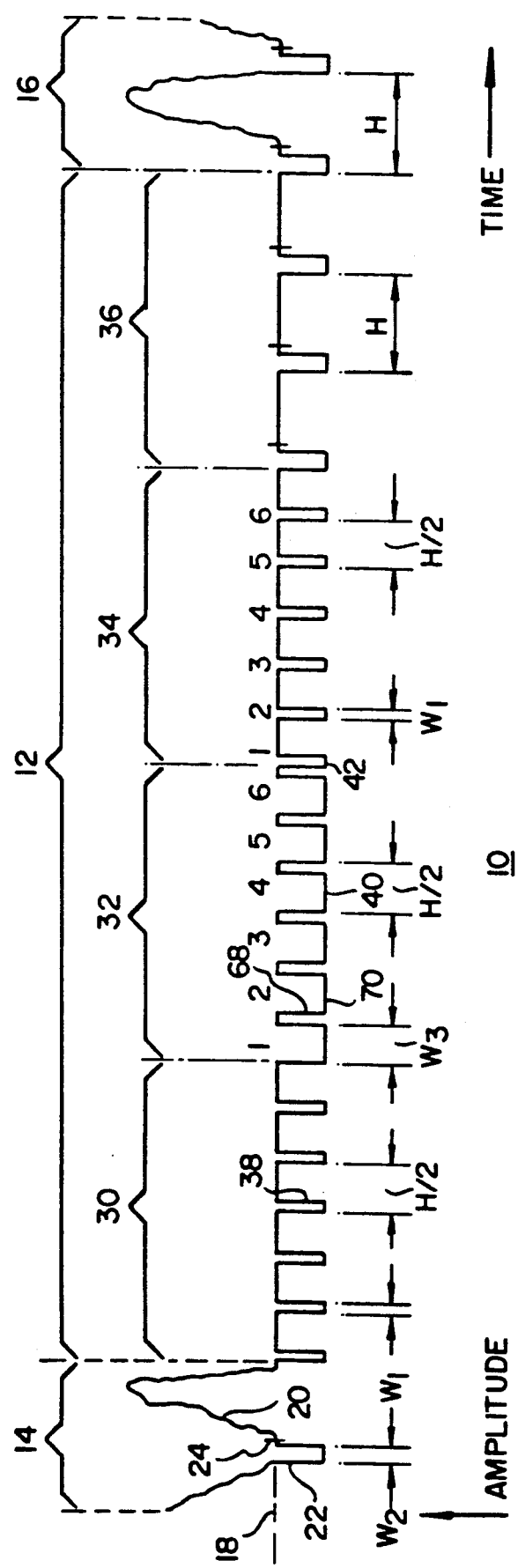
FIG. 1 illustrates a portion of a composite NTSC video signal centered about the vertical blanking interval in accordance with the prior art.

FIG. 1 illustrates a waveform 10 representing a portion of a standard television composite signal, specifically that portion indicated by bracket 12, known as the vertical blanking interval (VBI). Also illustrated as part of waveform 10 are the last 1½ lines of video preceding the VBI, as identified by bracket 14, and the first 1½ lines of video following the VBI, as identified by bracket 16. The vertical axis of waveform 10 represents amplitude, while the horizontal axis represents time. The blanking level amplitude is indicated by dashed line 18.

It will be remembered from the discussion in the Background of the Invention section that amplitudes on one side of (in this case, above) the blanking level are video, waveform portion 20 being an example, while amplitudes on the other side of (here, below) the blanking level are synchronization pulses such as horizontal sync pulse 22. An exemplary color burst signal which alternates above and below the blanking level is illustrated at 24.

The VBI 12 is comprised of several parts, a pre-equalizing pulse interval indicated by bracket 30, a vertical sync pulse interval indicated by bracket 32, a post-equalizing pulse interval indicated by bracket 34, and a reference subcarrier phase indicated by bracket 36. It will be noted from a review of FIG. 1 that each of the six pre-equalizing and six post-equalizing pulses, 38 being an example, are narrower than the horizontal sync pulses 22, while the vertical sync pulses are substantially wider than the horizontal sync pulses 22, as exemplified by vertical sync pulse 40.

Thus, if the width of a pre-equalizing or post-equalizing pulse is of width $W_1$, the width of a horizontal sync pulse is $W_2$, and the width of a vertical sync pulse is $W_3$, then $W_1 < W_2 < W_3$. It should also be noted that if the pulse-to-pulse spacing of the horizontal sync pulses is H, as indicated under bracket 16, then the pulse-to-pulse spacing of pre-equalizing pulses, post-equalizing pulses, and vertical sync pulses is ½H. It should be noted from FIG. 1 that the spacing between all six post-equalizing pulses indicated bracket 34 is uniform and is equal to ½H as previously mentioned. Furthermore, it will be understood that the width of each of those pulses, as utilized in the prior art, is $W_1$.

FIG. 2, to which attention is now directed, is identical to FIG. 1 except in one important aspect. The changed aspect is in the area indicated by circle 50. It will be noted that within circle 50 and as better illustrated in FIG. 3, which is that portion of waveform 10 within circle 50, that pulse 52 is of substantially greater duration than the equivalent pulse 42 in FIG. 1.

Pulse 52 in FIG. 2 begins at the same position as does pulse 42 in FIG. 1, that is, it is the leading or negative-going edge of the first pulse within the post-equalizing pulse interval. However, the termination of pulse 52, is at a later time than the positive-going termination of pulse 42 in FIG. 1 and therefore its duration, is greater than that of pulse 42.

Thus, the presence or absence of a special pulse 52, and, if present, its duration, can be used to transmit additional information in the vertical blanking interval over that which is present with the conventional vertical blanking interval 12 illustrated in FIG. 1. Furthermore, it will be understood that although only one widened pulse, 52, is illustrated in FIG. 2, and in FIG. 3, other one or ones of the six post-equalizing pulses could also be of longer than normal duration to provide further information. The modified pulse or pulses as illustrated in FIGS. 2 and 3 can be used for a variety of purposes. One such purpose is to switch on equipment down stream of the television signal. Other uses are for counters.

Figure 4:
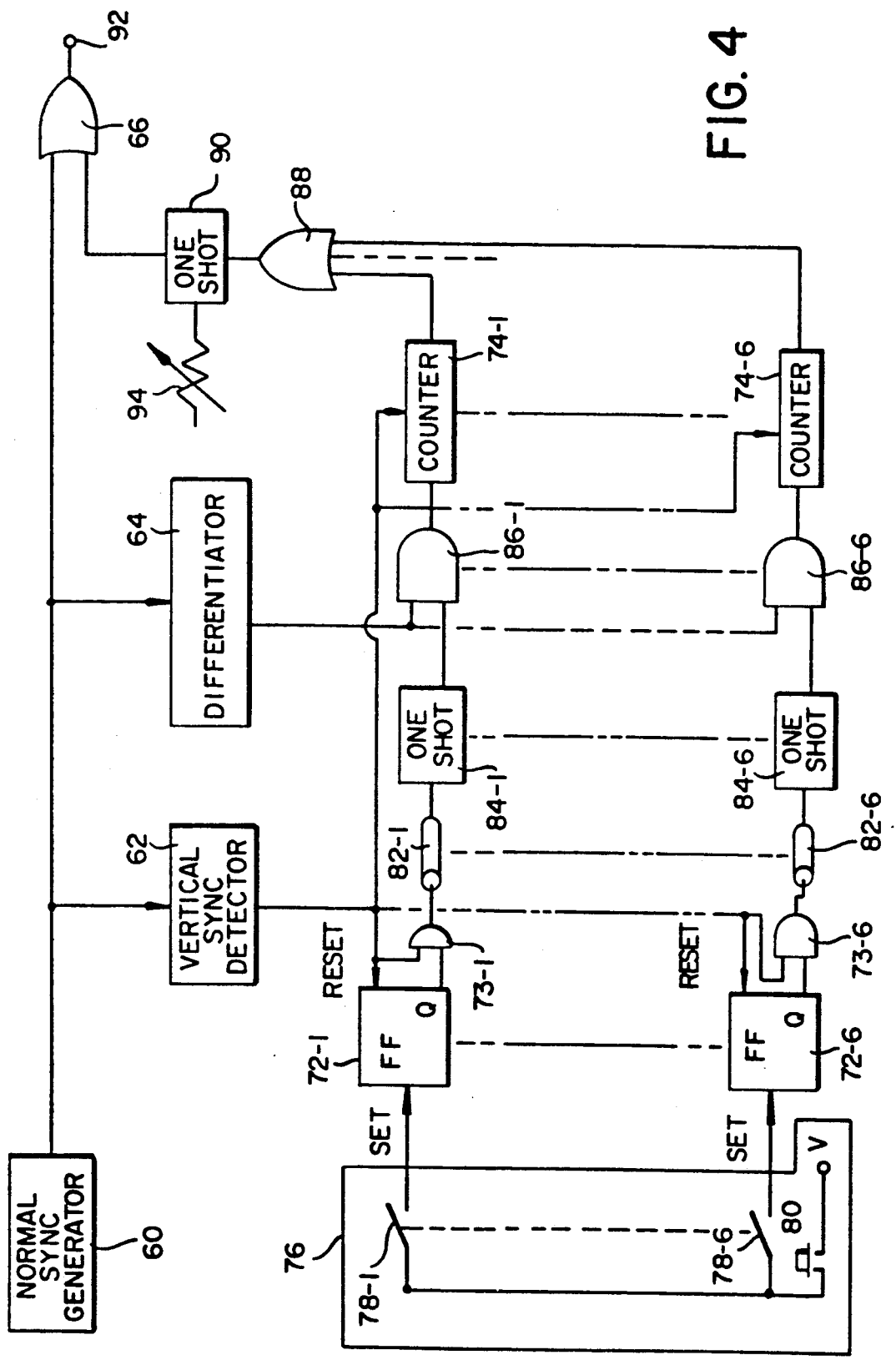
FIG. 4 illustrates apparatus for producing the waveform of FIG. 2.

Referring now to FIG. 4, which illustrates exemplary apparatus in block and logic form for creating one or more lengthened post-equalizing pulses, block 60 produces the standard horizontal sync pulses, pre-equalization pulses, vertical sync pulses, and post-equalizing pulses, and the reference subcarrier pulses, all as illustrated in FIG. 1. Generator 60 is of conventional design and will not be further described. The output of generator 60 is connected to the input of vertical sync detector 62, the input of differentiator 64, and as one input of OR gate 66. Vertical sync detector 62 is of conventional design and produces a momentary pulse corresponding in time with the production of the leading edge 68 (negative going edge) of the second vertical sync pulse 70 (FIGS. 1 and 2). Differentiator 64 produces a momentary pulse at the leading edge of each sync pulse in the vertical blanking interval. It may also produce pulses corresponding to the horizontal sync pulses, but that is of no importance to the operation of FIG. 4.

The output of vertical sync detector 62 is connected to a RESET input of a Q-type flip-flop 72-1 and to the RESET input of up to five other similar flip-flops, flip-flop 72-6 being shown by way of example, if present in the system. It should be understood that in accordance with the invention only one flip-flop 72-1, or its equivalent, need be present for operation of the invention. The output of vertical sync detector 62 is also connected to one input of AND gate 73-1 and up to five other AND gates, AND gate 73-6 being exemplary. The output of vertical sync detector 62 is also connected to the RESET input of a counter 74-1 and to the RESET input of up to five other counters, counter 74-6 being exemplary, if present.

An information source 76 is connected to the SET input(s) of flip-flop 72-X, where X=1, 2,...6, if present, in the system. Although information source 76 is illustrated to comprise a plurality of single-pole, single-throw switches 78-1...78-6 and an actuating push button switch 80 connected to a source of power V, the source could be, and probably would be, suitable electronically supplied information.

The Q outputs of flip-flops 72-X are coupled to the second inputs of AND gates 73-X. The outputs of AND gates 73-X are coupled to the inputs of momentary delays 82-X. The respective output of delays 82-X are coupled to respective inputs of one-shots 84-X. The respective outputs of one-shots 84-X are coupled to one input of respective AND gates 86-X. The output of differentiator 64 is coupled to the second inputs of respective AND gates 86-X. The outputs of AND gates 86-X are coupled to the respective clock inputs of counters 74-X. The outputs of counters 74-X are coupled to respective inputs of an OR gate 88. The output of OR gate 88 is coupled to the input of a one-shot 90, the output of which is coupled to the second input of AND gate 66. The output terminal of AND gate 66 is connected to output terminal 92. Potentiometer 94 controls the width or duration of the pulse produced by one-shot 90.

Operation of the system of FIG. 4 is as follows. Normal sync generator 60 produces the standard television synchronization signal including the vertical sync pulses and the post-equalizing pulses. Absent any signal from the output of one-shot 90, those signals are passed through OR gate 66 unchanged such that FIG. 1 represents the output of OR gate 66 and the output of normal sync generator 60 excluding the video amplitudes. Vertical sync detector 62 produces a momentary logic 1 pulse marking the leading edge of each second vertical sync pulse which output resets flip-flops 72-X. Normally, those flip-flops are, in fact, not set so the reset performs no useful nor detrimental function.

Assume now, however, that it is desired to increase the width of post-equalizing pulse 52, as illustrated in FIGS. 2 and 3. In that situation switch 78-1 is closed and push button 8 is momentarily depressed, causing flip-flop 72-1 to become set. As a result, the Q output changes from a logic 0, its normal reset value, to a logic 1. AND gate 73-1 is blocked at this time since the normal output from vertical sync detector 62 is a logic 0. When the next vertical blanking interval occurs after the momentary depressing of switch 8, the momentary logic 1 pulse from vertical sync detector 62 resets flip-flop 72-1, as previously described, and also momentarily enables AND gate 73-1 which produces a momentary output pulse. The leading edge of this pulse is delayed very slightly, much less than the pulse-to-pulse spacing of the vertical sync pulses and applied to one-shot 84 which produces a signal corresponding in time to the time to produce at least the number of remaining pulses in the vertical sync pulse interval and to one pulse in the post-equalizing pulse interval.

As a result of the signal from one-shot 84-1 enabling AND gate 86-1, each succeeding pulse produced by differentiator 64, that is, corresponding to the leading edge of the third, fourth, fifth, and sixth pulses in the vertical sync pulse interval, and the leading edge of the first post-equalizing pulse, counter 74-1 is advanced by one. The counter is designed to produce a momentary output when the leading edge of the first post-equalizing pulse is produced. This can either be accomplished by resetting the counter to a count of 2, for example, and producing an output when the counter reaches 7 or resetting the counter to 0 and producing an output when the counter reaches 5 or even resetting the counter to some number such as 5 and counting the counter down and producing an output when it reaches 0.

In any event, the momentary output from counter 74-1 corresponding in time to the production of the leading edge of the first post-equalizing pulse causes one-shot 90 to produce a lengthened pulse the duration of which is in accordance with the setting of potentiometer 94. This lengthened pulse is ORed with the normal first post-equalizing pulse produced by normal sync generator 60 and the resulting lengthened pulse is transmitted from the output of OR gate 66 at terminal 92.

It will be understood that the purpose of delay 82-1 is to insure that one-shot 84-1 does not produce an output until slightly after the leading edge of the second vertical sync pulse to insure that counter 74-1 does not incorrectly count that second pulse. The operation of the other flip-flops, delays, one-shots, AND gates, and counters are similar to the operation just described, except that the output of the respective counters marks the beginning of the second, third, fourth, fifth, and sixth post-equalizing pulses if a respective switch 78-X is energized.

Figure 5:
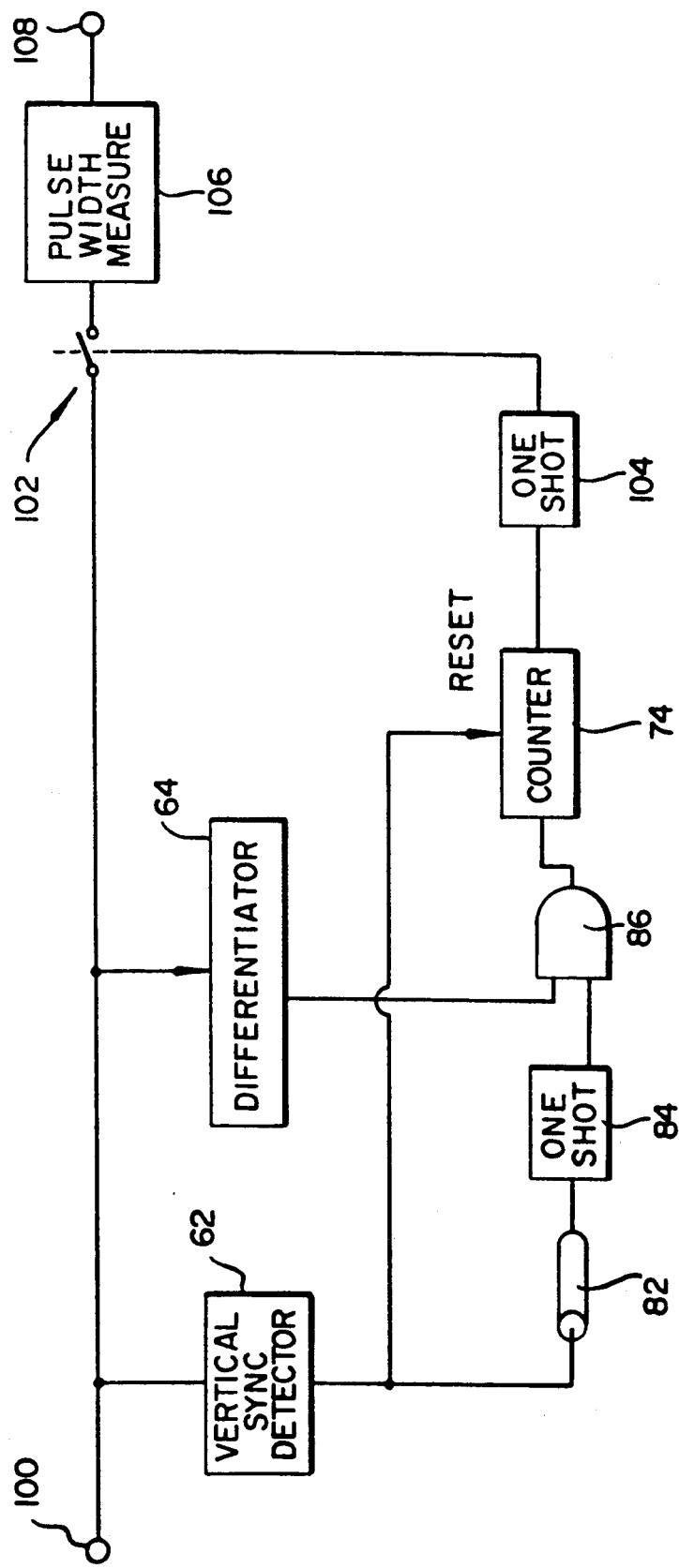
FIG. 5 illustrates apparatus for detecting a widened post-equalizing pulse produced by the apparatus of FIG. 4.

FIG. 5, to which attention is now directed, is exemplary apparatus for detecting a widened post-equalizing pulse as produced by the apparatus of FIG. 4. Terminal 100 of FIG. 5 may be connected directly to output pulse 92 of FIG. 4 but a more common situation is that terminal 92 is connected to an electrical bus of a large system (not shown) and terminal 100 is also connected to that same bus. Alternatively, terminal 92 may be connected to some sort of radio frequency transmitter and terminal 100 may be connected to a radio frequency receiver. Furthermore, it will be understood that there may be a number of receivers such as illustrated in FIG. 5, all coupled in some manner to output terminal 92 of FIG. 4. In FIG. 5, many of the components are identical to the same components in FIG. 4 and thus are numbered similarly. Thus, in FIG. 5 terminal 100 is connected to the input of vertical sync detector 62, identical to detector 62 in FIG. 4, connected to differentiator 64, identical to differentiator 64 in FIG. 4, and connected to a controlled switch 102 which has no equivalency in FIG. 4. Delay 82, one-shot 84, AND gate 86, and counter 74 are identical to those same components in FIG. 4 and are similarly interconnected and connected with detector 62 and differentiator 64. The output of counter 74 is connected to a one-shot 104, the output of which is coupled to control switch 102. The output of switch 102 is coupled to a pulse width measuring circuit 106, having an output terminal 108. Pulse width measuring circuit 106 is receptive of a signal and produces an output with a first or second value depending on whether the width of each pulse applied thereto is less than or greater than some preselected value.

The operation of the apparatus of FIG. 5 is as follows. The signal received at terminal 100 which occasionally contains a widened post-equalizing pulse is passed to sync detector 62 and differentiator 64. Upon the occurrence of the leading edge of the second vertical sync pulse in a frame which either does or does not contain a widened post equalizing pulse, detector 62 produces a momentary output pulse which, via delay 82, energizes one-shot 84 to open AND gate 86 to receive pulses from differentiator 64. Counter 74 then counts each pulse produced by differentiator 64, that is the remaining vertical sync pulses until that one of the post-equalizing pulses, whose width is to be determined is received. When the desired post-equalizing pulse is received, counter 74 produces an output to energize one-shot 104 to thus close switch 102. Pulse width measuring device 106 then determines the width of the pulse. If it is the normal, non-widened, pulse, the measuring circuit produces one value of output signal. If, on the other hand, the pulse is a widened pulse as indicated in FIG. 3, then measuring device 106 produces a second value of output to indicate that a widened pulse has been received.

If more than one of the post-equalizing pulse is widened in a system, such as one that would employ multiple counters in FIG. 4, then multiple counters similarly configured in FIG. 5 would be employed, each configured to receive inputs from detector 62 and gate 86, and an additional OR gate such as 88 would be utilized as in FIG. 4.

Returning to FIG. 4, it should be understood that with the proper hardware any one, or more than one, or all of the post-equalizing pulses can be lengthened in duration. Furthermore, even the width of each of the equalizing pulses could be the same or could be different if device 94 were provided with automatic control in a known manner. If only one flip-flop 72 is present, such as 72-1, then there is no need for an equivalent of single-pole, single-throw switch 78-1 but rather a momentary push button could be substituted therefore connected directly to an appropriate voltage source. It will be understood that only the width of the post-equalizing pulses is altered and not the amplitude, and further that there are no video amplitudes added to the post-equalizing portion of the vertical blanking interval. It will be understood that no circuitry has been illustrated for the production of video even in those portions of the waveform that normally have video since apparatus for producing such video is well known and is of no criticality to the invention.

What is claimed is:

1. In apparatus which includes means for producing a television vertical blanking interval signal, which signal includes a pre-equalization interval, a vertical synchronization pulse interval and a post-equalization pulse interval said post-equalization pulse interval comprising a plurality of relatively short duration pulses spaced at a relatively long pitch, the improvement comprising:
   means responsive to a source of information for extending the duration, without changing the amplitude, of at least one of said short duration pulses in accordance with the value of said information.

2. The combination as set forth in claim 1 wherein said means for extending extends the duration of said at least one of said short duration pulses by a given amount if said information is of one value and does not extend the duration thereof if said information is of another value.

3. The combination as set forth in claim 1 wherein said means for producing said vertical blanking interval includes means for producing a plurality of pulses in said vertical synchronization pulse interval and wherein said means for extending includes means for counting a given number of said vertical synchronization pulse interval pulses and post-equalization pulses for producing a signal when that one of said post-equalization pules is produced, the duration of which is to be widened and wherein said means for extending further includes means responsive to the signal from said means for counting for causing the duration of that one pulse to be extended.

4. The combination as set forth in claim 3 further including a plurality of means for counting, each adapted to produce a signal when a different one of said post-equalization pulses is produced, said means for causing the duration of said one pulse to be extended responsive to the output signals from the various means for counting for causing the duration of a plurality of respective pulses to be extended.

5. The combination as set forth in claim 3 further including means responsive to a given one of said vertical synchronizing interval pulses for loading a preset count value into said means for counting to thereby cause said means for counting to produce a signal when said one of said post-equalization pulses is produced.

6. The combination as set forth in claim 4 further including means responsive to a given one of said vertical synchronization pulses to preload each of said plurality of counters with values such as to cause said counters to produce said signals when various ones of said post-equalization pulses are produced.

* * * * *